United States Patent
Uchida

(10) Patent No.: US 10,136,476 B2
(45) Date of Patent: Nov. 20, 2018

(54) INDUCTIVE HEATING DEVICE, METHOD FOR CONTROLLING INDUCTIVE HEATING DEVICE, AND PROGRAM

(71) Applicant: Mitsui Engineering & Shipbuilding Co., Ltd., Tokyo (JP)

(72) Inventor: Naoki Uchida, Tamano (JP)

(73) Assignee: MITSUI E&S MACHINERY CO., LTD., Tokyo (JP)

(*) Notice: Subject to any disclaimer, the term of this patent is extended or adjusted under 35 U.S.C. 154(b) by 0 days.

(21) Appl. No.: 14/439,457

(22) PCT Filed: Oct. 30, 2013

(86) PCT No.: PCT/JP2013/079417
§ 371 (c)(1),
(2) Date: Apr. 29, 2015

(87) PCT Pub. No.: WO2014/069526
PCT Pub. Date: May 8, 2014

(65) Prior Publication Data
US 2015/0289321 A1    Oct. 8, 2015

(30) Foreign Application Priority Data

Oct. 30, 2012 (JP) ................. 2012-239432

(51) Int. Cl.
*H05B 6/06* (2006.01)
*H05B 6/04* (2006.01)
(Continued)

(52) U.S. Cl.
CPC .......... *H05B 6/06* (2013.01); *H02M 5/4585* (2013.01); *H05B 6/04* (2013.01); *H05B 6/104* (2013.01); *H05B 6/44* (2013.01)

(58) Field of Classification Search
CPC ......... H02M 5/4585; H05B 6/04; H05B 6/06; H05B 6/104; H05B 6/44
(Continued)

(56) References Cited

U.S. PATENT DOCUMENTS 4,390,769 A * 6/1983 Steigerwald .......... H05B 6/062
219/661
4,730,242 A * 3/1988 Divan ................. H02M 5/4585
363/127
(Continued)

FOREIGN PATENT DOCUMENTS

DE   112011102681 T5   6/2013
EP       2405711 A2    1/2012
(Continued)

OTHER PUBLICATIONS

Office Action from State Intellectual Property Office in China, in corresponding Chinese application 2015120200694130, dated Nov. 27, 2015, 6 pp. in Chinese.
(Continued)

*Primary Examiner* — Tu B Hoang
*Assistant Examiner* — Diallo I Duniver
(74) *Attorney, Agent, or Firm* — Juan Carlos A. Marquez; Marquez IP Law Office, PLLC

(57) ABSTRACT

A control is performed so that phase angles of outputs from resonant inverters fall within a predetermined range under a mutual induction environment. An inductive heating device (100) includes: a plurality of resonant inverters (30a, 30b) that supply power to a plurality of inductive heating coils (La, Lb), respectively, under a mutual induction environment; and a control circuit (40) that aligns drive frequencies so as to be in common among the resonant inverters and controls the drive frequencies commonly so that phase angles of the outputs from the plurality of the resonant
(Continued)

inverters fall within a predetermined range. In addition, the control circuit individually controls coil currents flowing through the inductive heating coils so that the phase angles fall within a predetermined range.

3 Claims, 8 Drawing Sheets

(51) Int. Cl.
    *H05B 6/44* (2006.01)
    *H02M 5/458* (2006.01)
    *H05B 6/10* (2006.01)

(58) Field of Classification Search
    USPC ....... 219/662, 660, 663, 664, 665, 666, 667, 219/668, 669
    See application file for complete search history.

(56) References Cited

U.S. PATENT DOCUMENTS 5,523,631 A * 6/1996 Fishman ................ H02M 7/48
                                                    219/662
5,951,904 A * 9/1999 Jung ........................ H05B 6/04
                                                    219/626
2005/0199614 A1* 9/2005 Uchida .................. A45D 20/12
                                                    219/662
2013/0140298 A1 6/2013 Uchida et al.

FOREIGN PATENT DOCUMENTS

| JP | 2004-259665 A | 9/2004 |
| JP | 2005-420475 A | 9/2005 |
| JP | 2005-529475 A | 9/2005 |
| JP | 2006-040693 A | 2/2006 |
| JP | 2010-245002 A | 10/2010 |
| JP | 2011-014331 A | 1/2011 |
| JP | 2012-199158 A | 2/2012 |
| JP | 2012-199157 A | 10/2012 |
| JP | 5296949 B1 | 12/2013 |
| WO | 2012020652 A1 | 2/2012 |

OTHER PUBLICATIONS

International Search Report in corresponding PCT application PCT/JP2013/079417 dated Dec. 3, 2013, 2 pp. in English and 2 pp. in Japanese.

\* cited by examiner

INDUCTIVE HEATING DEVICE, METHOD FOR CONTROLLING INDUCTIVE HEATING DEVICE, AND PROGRAM

TECHNICAL FIELD

The present invention relates to an inductive heating device using a plurality of inductive heating coils, a method for controlling an inductive heating device, and a program.

BACKGROUND OF THE INVENTION

A semiconductor production equipment by thermally processing a wafer is required to control a temperature difference on the surface of the wafer to be minimized (e.g., within ±1° C.) in order to avoid problems such as thermal strain. Also, the equipment is required to rapidly increase a temperature (e.g., 100° C./sec) up to a desired temperature (e.g., 1350° C.). Then, an inductive heating device is widely known, in which an inductive heating coil is divided into multiple pieces and high frequency power supply (e.g., an inverter) is individually connected to each piece for performing power control. However, since the divided inductive heating coils are mutually adjacent, mutual inductances M are present to cause mutual inductive voltages. Therefore, respective inverters are operated in parallel with mutual inductances in between, and this causes mutual power exchanges between the inverters when there are phase shifts in electric currents of respective inverters. That is, since phase shifts are caused in magnetic fields among the divided inductive heating coils due to phase shifts in the electric currents in the respective inverters, magnetic fields in the vicinity of the boundary of the adjacent inductive heating coils are weakened to reduce the density of heat generated by inductive heating power. As a result, temperature variations may be caused on the surface of the heated object (such as a wafer).

Then, a technique of "ZONE Controlled Induction Heating" (ZCIH) has been proposed by the present inventor and others, in which even under conditions where mutual inductances are present to cause mutual inductive voltages between adjacent inductive heating coils, inductive heating power can be controlled as appropriate so as to prevent circulation currents from flowing between mutual inverters and to prevent heat generation density from decreasing in the vicinity of the boundary of the divided inductive heating coils (see Japanese Patent Application Publication No. 2011-014331 A (Claim 1, paragraph 0061 in Description) for example). According to this technique of ZCIH, each power supply unit is configured to individually include a step-down chopper and a voltage inverter (hereinafter, simply referred to as an inverter). Respective power supply units divided in multiple power supply zones are separately connected to respective inductive heating coils divided into pieces to supply power.

At this time, a current synchronization control (i.e., synchronization control of a current phase) is performed for an individual inverter in each power unit, that is, current phases flowing through respective inverters are synchronized to avoid circulation currents from flowing between multiple inverters. In other words, exchanging electric currents between multiple inverters are avoided to prevent overvoltage from being caused due to regenerative power flowing into inverters. In addition, by synchronizing current phases flowing through respective induction heating coils divided into pieces, with a current synchronization control of inverters, the heat generation density by the inductive heating power is prevented from sharply decreasing at the vicinity of the boundary of respective inductive heating coils. Further, by controlling input voltage of each inverter by way of each step-down chopper, a current amplitude control is performed for each inverter to control inductive heating power to be supplied to each inductive heating coil.

Japanese Patent Application Publication No. 2011-014331 A (Claim 1, paragraph 0061 in Description) describes a technique of performing a frequency sweep from a frequency higher than the resonant frequency downward, selecting a unit that first reaches a resonance point, and driving all the inverter circuits with the same switching frequency as that resonant frequency. This allows the technique described in Japanese Patent Application Publication No. 2011-014331 A (Claim 1, paragraph 0061 in Description) to maintain L-controlled driving at all the inverter circuits.

SUMMARY OF THE INVENTION

Problems to be Solved by the Invention

With the technique described in Japanese Patent Application Publication No. 2011-014331 A (Claim 1, paragraph 0061 in Description), since an inverter having the highest resonant frequency is set to have a minimum phase angle, at which a phase difference becomes minimal between a rising timing of output rectangular wave voltage and a zero cross timing of the resonant current, the power factor of this particular inverter is high. However, the technique fails to take into account the power factor of other inverters (zones), then it is impossible to output the rated power, nor to reduce a switching loss by reducing the phase angle. In other words, the technique described in Japanese Patent Application Publication No. 2011-014331 A (Claim 1, paragraph 0061 in Description) fails to control the entire zones in an optimal way.

Note that the technique described in Japanese Patent Application Publication No. 2011-014331 A (Claim 1, paragraph 0061 in Description) performs a frequency sweep in order to use common units and to avoid loads from being fluctuated irregularly (see paragraph 0007).

Then, the present invention is intended to solve such a problem, and to provide an inductive heating device, a method for controlling the inductive heating device, and a program that are capable of optimally controlling all the resonant inverters.

Means for Solving Problems

In order to achieve the above objective, the present invention provides an inductive heating device including: a plurality of resonant inverters that supply power to a plurality of inductive heating coils, respectively, under a mutual induction environment; and a control circuit that aligns drive frequencies so as to be in common among the plurality of the resonant inverters and controls the drive frequencies commonly so that phase angles of outputs from the plurality of the resonant inverters fall within a predetermined range.

DC voltages are controlled to operate the device in a lagging phase mode of resonant current so that a zero-cross timing, at which a current flowing through a series resonant circuit of the inductive heating coil and a capacitor zero crosses from negative to positive, lags behind a rising timing of a voltage applied to the series resonant circuit. On the other hand, a power factor decreases when all the series resonant circuits are set to the lagging phase mode. In addition, since a low power inverter having a voltage width less than a predetermined value operates in a leading phase mode of resonant current but with a low output power, an accumulated loss and a surge voltage may be small enough to avoid transistors from being broken. Therefore, the control circuit changes the drive frequencies commonly and controls it so that phase differences (output phase angles) between all the series resonant circuits fall within an optimum phase angle range. This optimum phase angle range is any of (1) the minimum output phase angle of 20 degrees or more, at which a ZVS can be secured, (2) output phase angle of 30 degrees or less, at which the rated output (P=V*I*COS Θ) can be outputted, and (3) output phase angle of 30 degrees or less, at which a switching loss due to a reactive current (Isw=Ip×SIN Θ) becomes small enough, where the reactive current is a reactive power component of a current flowing through a series resonant circuit. During an isolated operation, self-inductance L or capacitance C of the self-resonant circuit is adjusted so that the output phase angle falls within the optimum phase angle range, as described above, at a reference frequency. Note that the output phase angles of 20 degrees and 30 degrees are shown as examples.

Note that it may also be possible to provide an inductive heating device including: a plurality of resonant inverters that supply power to a plurality of inductive heating coils, respectively, under a mutual induction environment; and a control circuit that controls coil currents flowing through the plurality of the inductive heating coils so that phase angles of impedance of resonant circuits respectively connected to the plurality of the resonant inverters become substantially equal to respective phase angles of mutual inductive voltages derived from mutual induction.

This allows the output phase of the resonant inverter to be the same, regardless of a drive frequency, and then to be optimally controlled.

Advantageous Effects of the Invention

According to the present invention, all the resonant inverters are optimally controlled.

EMBODIMENT OF THE INVENTION

Figure 1A:
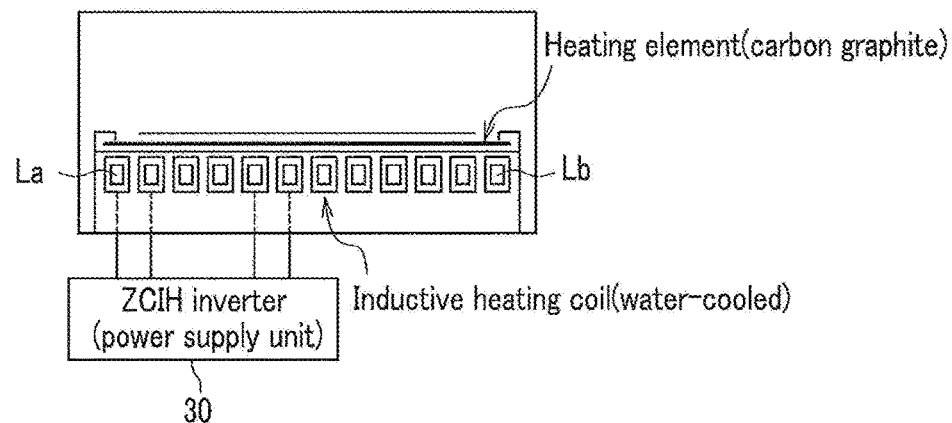
FIGS. 1A and 1B are schematic diagrams of a heating device for semiconductors using an inductive heating device according to a first embodiment of the present invention.

Hereinafter, a description will be given in details of an embodiment according to the present invention, with reference to drawings. Note that the drawings are merely shown schematically to the extent that the present invention can fully be understood. Then, the present invention is not limited to the illustrated examples. In addition, in the drawings, common components and similar components are given the same reference numerals and duplicate descriptions thereof will be omitted.

First Embodiment

Figure 1B:
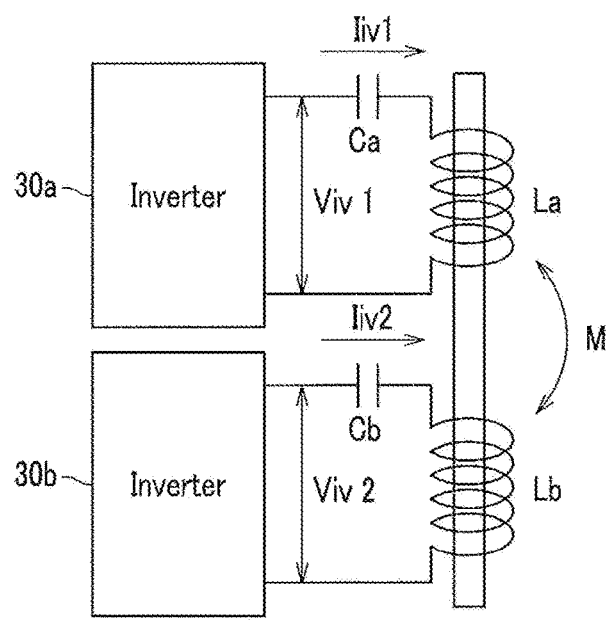

FIGS. 1A and 1B are schematic diagrams of a heating device for semiconductors using an inductive heating device according to a first embodiment of the present invention.

An RTA (Rapid Thermal Anneal) device (heating device for semiconductors) as an inductive heating device includes a heat-resistant plate that has a plurality of inductive heating coils La, Lb embedded in depressed portions, a common heating element that is arranged on the surface of the heat-resistant plate, and a plurality (two) of inverters 30 (30a, 30b) as inverse conversion devices, and is configured to heat the heating element separately in two zones by the plurality of the inductive heating coils La, Lb. This RTA device is configured so that the inductive heating coils La, Lb individually generate high frequency magnetic fluxes, which in turn cause eddy currents to flow through the heating element, for example, made of carbon graphite (hereinafter simply referred to graphite), and then heat is produced in the heating element by the eddy currents flowing through resistance component of the graphite. This radiant heat of the heating element heats a glass substrate or a wafer as an object to be heated. Note that in the heat treatment of a semiconductor, this heating is performed in a reduced-pressure atmosphere or in an inert atmosphere (e.g., in a nitrogen atmosphere).

FIG. 1B is a block diagram of an inductive heating device. The two inductive heating coils La, Lb are wound around a common graphite. One end of a capacitor Ca is connected to one end of the inductive heating coil La, and the other end of the capacitor Ca and the other end of the inductive heating coil La are connected to the inverter 30a. Also, one end of the inductive heating coil Lb is connected to one end of a capacitor Cb, and the other end of the capacitor Cb and the other end of the inductive heating coil Lb are connected to the inverter 30b. Note that the capacitor Ca has a capacitance C1, and the capacitor Cb has a capacitance C2. In addition, the inverters 30a, 30b function as resonant inverters to resonate the inductive heating coils La, Lb with the resonant capacitors Ca, Cb.

Here, the inductive heating coils La, Lb are, as being wound around a common graphite, coupled by a mutual inductance M. In addition, in FIG. 1B, the inverter 30a generates a voltage Viv1 to flow a current I1 through the capacitor Ca and the inductive heating coil La, while the inverter 30b generates a voltage Viv2 to flow a current I2. The mutual inductance M represents a reactive component of induced voltage which is induced in the coil La by the current I2 flowing through the inductive heating coil Lb. A reactive component of mutual inductive voltage, which is induced in the inductive heating coil La due to temporal changes in the current I2 flowing through the inductive heating coil Lb, and a reactive component of mutual inductive voltage, which is induced in the inductive heating coil Lb due to temporal changes in the current I1 flowing through the inductive heating coil La, are equal to each other. Note that the reactive component of mutual inductive voltage refers to a reactive power component of mutual inductive voltage induced in a coil.

Figure 2:
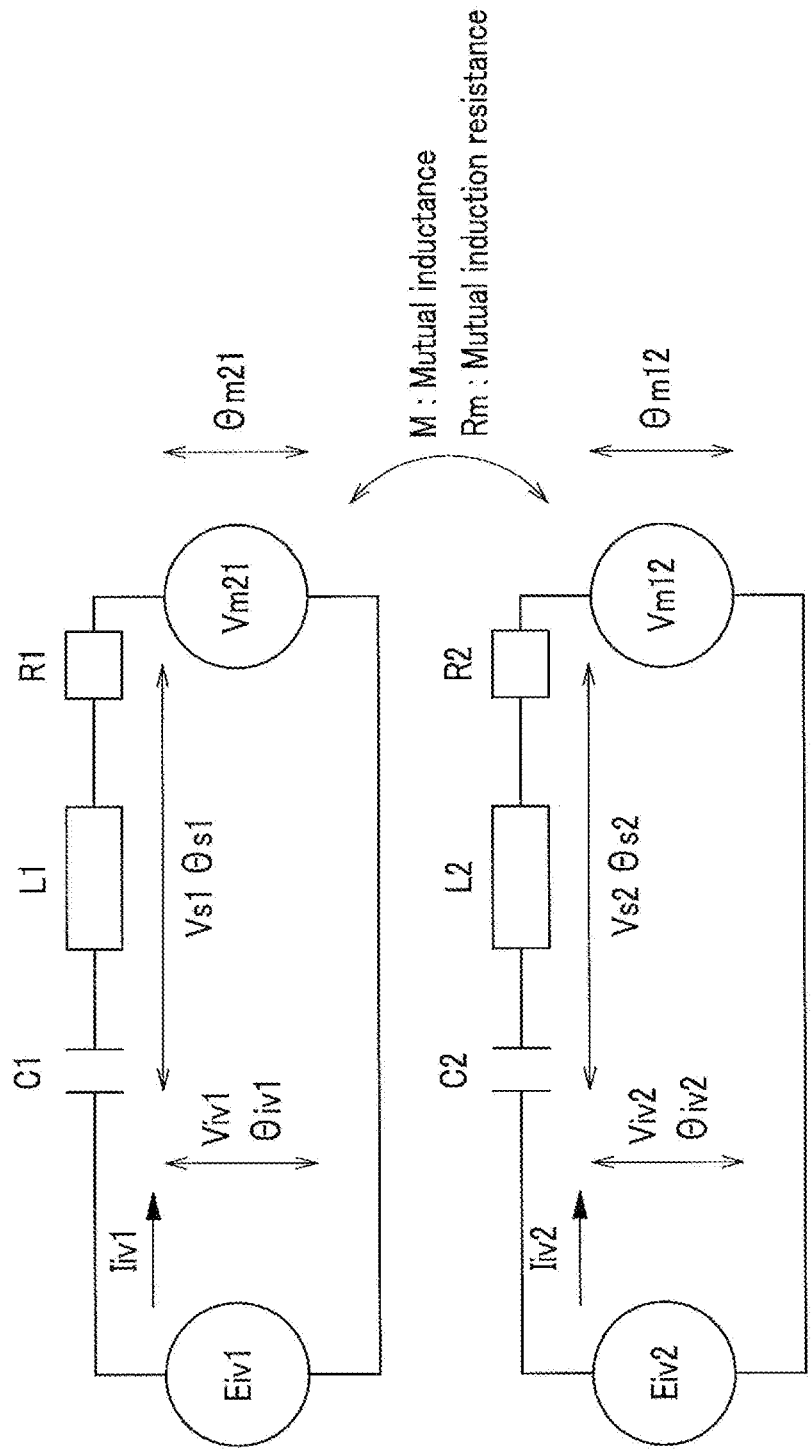
FIG. 2 is an equivalent circuit diagram of two resonant circuits in the inductive heating device.

FIG. 2 is an equivalent circuit diagram of the two resonant circuits in the inductive heating device.

The inductive heating coils La, Lb have self-inductances L1, L2 and equivalent resistances (equivalent resistances R1, R2) due to eddy currents in the graphite. That is, a series circuit of the inductive heating coil La and the capacitor Ca is represented by a series resonant circuit of a capacitor with a capacitance C1, an inductor with a self-inductance L1, and a resistor with an equivalent resistance R1. Then, this series resonant circuit is applied with a difference voltage between the voltage Viv1 of a voltage source Eiv1 and a mutual inductive voltage Vm21 from the inductive heating coil Lb. In addition, the voltage source Eiv1 generates the voltage Viv1 having a phase angle Θiv1 to flow a current Iiv1. The series resonant circuit causes a voltage drop Vs1 having a phase angle Θs1.

Also, a series circuit of the inductive heating coil Lb and the capacitor Cb is represented by a series resonant circuit of a capacitor with a capacitance C2, an inductor with a self-inductance L2, and a resistor with an equivalent resistance R2. Then, this series resonant circuit is applied with a difference voltage between the voltage Viv2 of a voltage source Eiv2 and a mutual inductive voltage Vm12 from the inductive heating coil La. In addition, the voltage source Eiv2 generates the voltage Viv2 having a phase angle Θiv2 to flow a current Iiv2. The series resonant circuit causes a voltage drop Vs2 having a phase angle Θs2.

In addition, when the two inductive heating coils La, Lb, which are wound around the common graphite, are coupled by the mutual inductance M, the inventor has contemplated that a mutual inductive resistance Rm may also exist. The mutual inductive resistance Rm represents, as a resistor, an active component of induced voltage which is induced in the inductive heating coil La by the current Iiv2 flowing through the inductive heating coil Lb. Further, an active component of a mutual inductive voltage, which is induced in the inductive heating coil La by the current Iiv2 flowing through the inductive heating coil Lb, is equal to an active component of a mutual inductive voltage, which is induced in the inductive heating coil Lb by the current Iiv1 flowing through the inductive heating coil La.

Furthermore, when low-resistance material such as metal is heated, the resonance sharpness Q=ωL/R(ωL1/R1, ωL2/R2) is high, causing $$\omega M \gg Rm,$$

to allow the mutual inductive resistance Rm to be ignored. However, when high-resistance material such as graphite is heated, the resonance sharpness Q=ωL/R is low, causing $$\omega M < Rm,$$

which requires that the mutual inductive resistance Rm be taken into account.

A phase angle Θm of mutual inductive voltage is $$\Theta m = \tan^{-1}(\omega M/Rm).$$

This phase angle Θm is rendered to be substantially equal to a phase angle $\Theta s = \tan^{-1}\{(\omega L - 1/\omega C)/Rs\}$ of self resonant circuit, i.e., Θm≈Θs. This causes, even when a gate pulse is uncontrolled, $$\Theta iv \approx \Theta s \approx \Theta m.$$

For metal, ωM>>Rm holds true, but for graphite, ωM≈Rm may hold true in some cases. However, if a gap between a coil and graphite becomes larger, it will cause ωM>>Rm.

Figure 3:
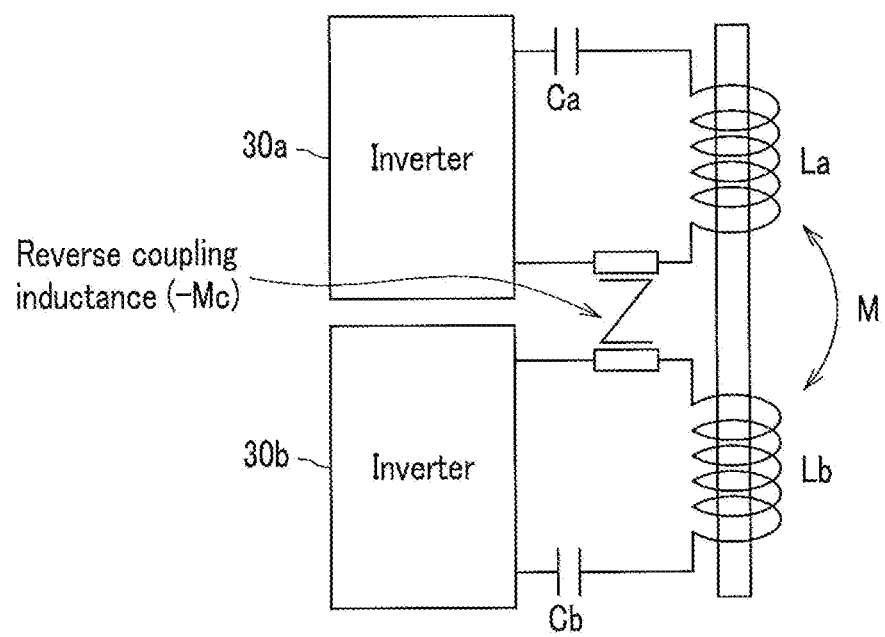
FIG. 3 is a schematic diagram where reverse coupling inductors are connected in the inductive heating device according to the first embodiment of the present invention.

Since a high power factor angle of Θiv=20 to 30 degrees is targeted, a reverse coupling inductor (−Mc) (FIG. 3) is provided to reduce the mutual inductance (M −Mc) in the entire circuit. Note that in this case a capacitor Cb is arranged between the other output side of the inverter 30b than the inductor, and the inductive heating coil Lb.

In other words, the eddy current, which is generated in the graphite by the current Iiv1 flowing through the inductive heating coil La, causes a drop of active component of voltage across the induction heating coil La, and at the same time induces an active component of mutual inductive voltage in the inductive heating coil Lb. Since a reactive component of mutual inductive voltage is also induced in the inductive heating coil La, as a result, both the reactive component of mutual inductive voltage and the active component of mutual inductive voltage are induced as a mutual inductive voltage Vm21. Similarly, both the reactive component of mutual inductive voltage and the active component of mutual inductive voltage are induced in the inductive heating coil Lb as a mutual inductive voltage Vm12.

At this time, the following circuit equation is satisfied.

That is, the voltage drop Vs1 of the series resonant circuit (C1, L1, R1) is $$Vs1 = Iiv1 \times \{R1 + j\omega L1 - j/(\omega C1*s1)\} = Iiv1 \times |Zs1| \times (\cos \Theta s1 + j \sin \Theta s1).$$

In addition, the mutual inductive voltage Vm21 induced in the inductive heating coil La is $$Vm21 = Iiv2 \times (Rm + j\omega M) = Iiv2 \times |Zm21| \times (\cos \Theta m21 + j \sin \Theta m21).$$

Here, $$|Zs1| = [R1^2 + \{\omega L1 - 1/(\omega*C1)\}^2]^{-1/2},$$

$$\Theta s1 = \tan^{-1}[\{\omega L1 - 1/(\omega*C1)\}/R1],$$

$$|Zm21| = \{Rm^2 + (\omega M)^2\}^{-1/2}, \text{ and}$$

$$\Theta m21 = \tan^{-1}\{\omega M/Rm\}.$$

Further, the voltage Viv1 of voltage source Eiv1 is $$Viv1 = |Vs1|(\cos \Theta s1 + j \sin \Theta s1) + |Vm21|(\cos \Theta m21 + j \sin \Theta m21).$$

Here, $$|Vs1| = Iiv1 \times Zs1, \text{ and}$$

$$|Vm21| = Iiv2 \times |Zm21|.$$

From the circuit equations described above, there can be following four states as seen from the inverter Eiv1, and control actions for these states will be presented.

Figure 4A:
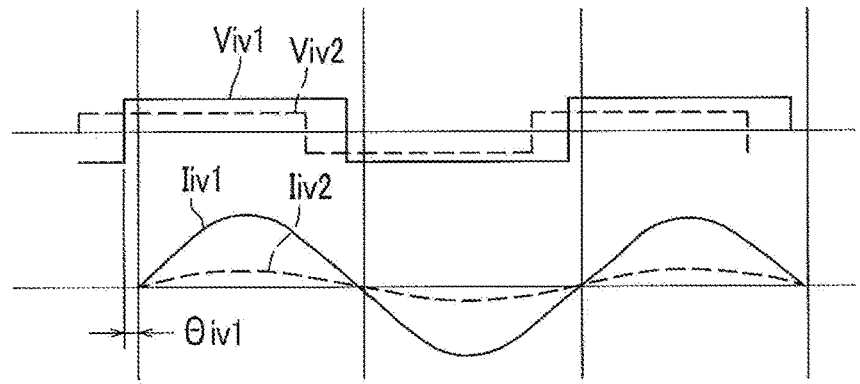
FIG. 4A is a diagram showing a state 1 of a voltage waveform applied to the inductive heating coil, and a current waveform.
Figure 4B:
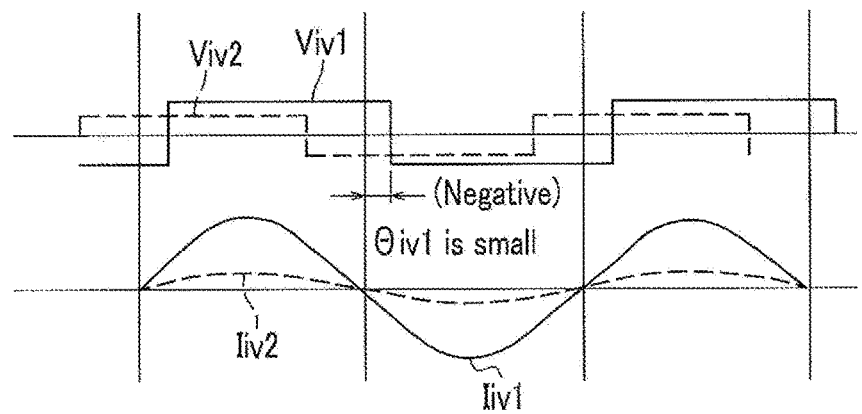
FIG. 4B is a diagram showing a state 2 of a voltage waveform applied to the inductive heating coil, and a current waveform.
Figure 4C:
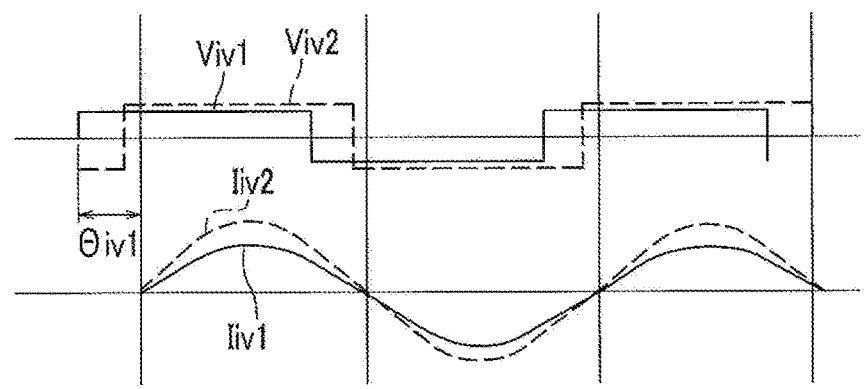
FIG. 4C is a diagram showing a state 3 of a voltage waveform applied to the inductive heating coil, and a current waveform.
Figure 4D:
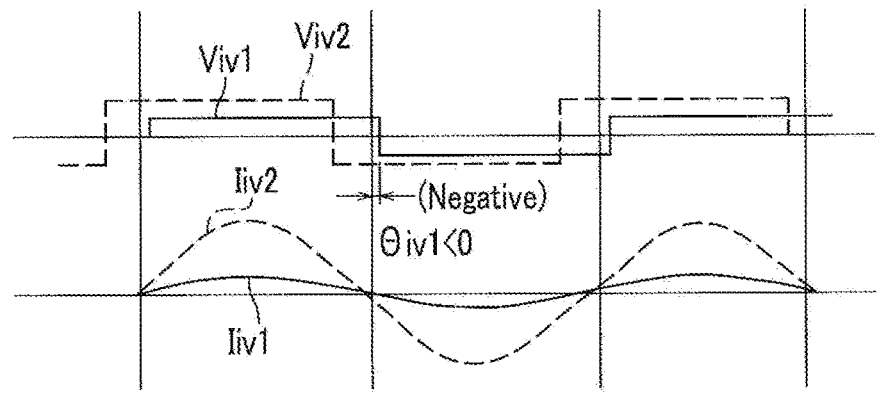
FIG. 4D is a diagram showing a state 4 of a voltage waveform applied to the inductive heating coil, and a current waveform.
Figure 4E:
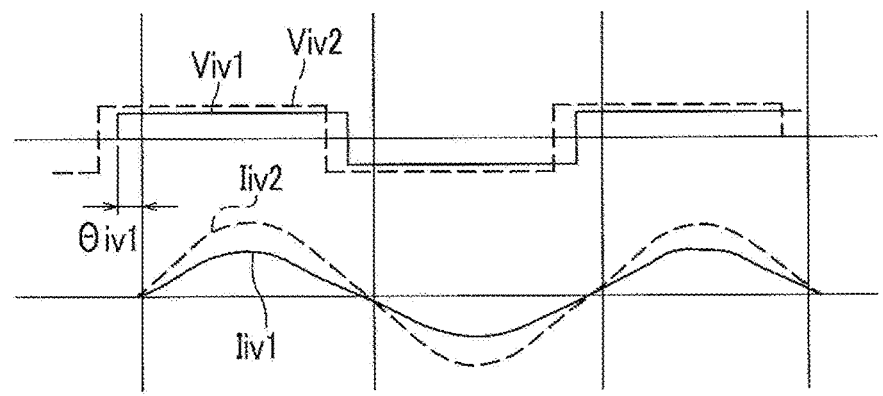
FIG. 4E is a diagram showing a result of an action to the state 4 of a voltage waveform applied to the inductive heating coil, and a current waveform.

FIGS. 4A to 4D are diagrams showing state 1 to state 4 of a voltage waveform applied to the inductive heating coil, and a current waveform, while FIG. 4E is a diagram showing an action to state 4 of the voltage waveform applied to the inductive heating coil, and the current waveform. In each drawing, the voltages Viv1, Viv2 of the voltage sources Eiv1, Eiv2 are rectangular wave voltages of DUTY 1/2, and coil currents Iiv1, Iiv2 flowing through two inductive heating coils La, Lb are aligned in phase to be in a state of current synchronization. That is, frequencies (drive frequencies) of the voltages Viv1, Viv2 and the coil currents Iiv1, Iiv2 are the same. Note that solid lines indicate the rectangular wave voltage Viv1 and the coil current Iiv1, while broken lines indicate the rectangular wave voltage Viv2 and the coil current Iiv2.

Essentially, for securing ZVS (Zero Volt Switching), a current phase lags behind a voltage phase. However, Iiv1 in FIGS. 4B and 4D has negative phase lagging by a small amount in absolute value (especially, contributing to the loss is a current Isw=Ip×sin Θ at a switching time).

The reverse coupling inductors (reverse coupling inductance −Mc) (FIG. 3) are arranged so that the mutual inductance (M−Mc) in the entire circuit falls in Θm=tan$^{-1}$(ωM/Rm)=20 to 30 degrees. This causes ωM/Rm=0.36 to 0.58.

This holds true both for metal and graphite.

(STATE 1)

In a case where Iiv1 is large, Iiv2 is small, and the mutual inductance M is large:
- as shown in FIG. 4A, since the value of Iiv2 is smaller than the value of Iiv1, the mutual inductive voltage Vm21 is small; therefore, when the self-inductance L1 decreases due to the temperature of the inductive heating coil La increasing, the phase angle Θiv1 decreases;
- for this state, the control circuit 40 (FIG. 5) takes an action to increase the drive frequency of the inverters 30a, 30b for increasing the phase angle Θiv1.

(STATE 2)

In a case where Iiv1 is large, Iiv2 is small, and the mutual inductive inductance M is small:
- a) as shown in FIG. 4B, since the value of Iiv2 is smaller than the value of Iiv1, the value of the mutual inductive voltage Vm21 is small; therefore, when the self-inductance L1 decreases due to the temperature of the inductive heating coil La increasing, the phase angle Θiv1 becomes negative;
- for this state, the control circuit 40 (FIG. 5) takes an action to increase the drive frequency of the inverters 30a, 30b to increase the phase angle Θiv1;
- b) the phase angle Θiv2 at the side of Eiv2 (see FIG. 2) decreases; when the drive frequency of the inverters 30a, 30b is increased for securing ZVS, the phase angle Θiv1 increases;
- in this case, if a current is equal to a predetermined value or more (e.g., 50% or more), the control circuit 40 (FIG. 5) decreases the driving frequency of the inverter 30a, 30b for reducing a switching loss, to decrease the phase angle Θiv1; however, if there is a command from other zone (zone 2) for increasing the drive frequency, priority will be given to increasing the frequency.

(STATE 3)

In a case where Iiv1 is small, Iiv2 is large, and the mutual inductance M is large:
- as shown in FIG. 4C, since the value of Iiv2 is larger than the value of Iiv1 and the mutual inductance M is large, the mutual inductive voltage Vm21 is large; on the other hand, since Iiv1 is small, the voltage drop Vs1 of the series resonant circuit is small; as a result, it causes Θiv1≈Θm21; if Θm21 is large, Θiv is also large;
- in this case, if a current is equal to a predetermined value or more (e.g., 50% or more), the control circuit 40 (FIG. 5) decreases the drive frequency of the inverter 30a, 30b for reducing a switching loss, to decrease the phase angle Θiv1; however, if there is a command from other zone (zone 2) for increasing the drive frequency, priority will be given to increasing the frequency.

(STATE 4)

In a case where Iiv1 is small, Iiv2 is large, and the mutual inductance M is small:
- as shown in FIG. 4D, since the value of Iiv2 is larger than the value of Iiv1, the mutual inductive resistance Rm affects more on the mutual inductive voltage Vm21 than the mutual inductance M to cause the mutual inductive voltage Vm21 to become large; on the other hand, since Iiv1 is small, the voltage drop Vs1 of the series resonant circuit becomes small; as a result, it causes Θiv1≈Θm21; therefore, if the mutual inductive resistance Rm is large and Θm21 is small, Θiv1 becomes small;
- in this case, for securing ZVS, the control circuit 40 (FIG. 5) increases only the current value if the current is smaller than a predetermined value (e.g., 15%), or increases only the drive frequency of the inverter 30a, 30b if the current Iiv1 is equal to the predetermined value or more (15% or more);
- that is, the control circuit 40 (FIG. 5) increases the rectangular wave voltage Viv1, as shown in FIG. 4E, to increase the current value (Iiv1), causing Θiv1 to be increased in positive values.

In order to optimize a range of the phase angle, actions to be taken are as follows when the phase angles Θiv1, Θiv2 and/or the coil currents Iiv1, Iiv2 fall into a condition in any zone such that:

(A) the phase angle is smaller than 20° and the coil current is smaller than 15% (such as state 4); in this case, the coil current Iiv is increased;

(B) the phase angle is smaller than 20 degrees and the coil current is equal to 15% or more; in this case, the drive frequency is increased for securing ZVS; that is, when the phase angles Θiv1, Θiv2 are smaller than a first predetermined value (20 degrees) and the amplitude of the coil currents Iiv1, Iiv2 is equal to a second predetermined value (15%) or more, the drive frequencies of all the resonant inverters are increased;

(C) the phase angle is equal to 20 degrees or more but smaller than 30 degrees; in this case, this condition shows a normal state but transitions to (A) or (B) above as the temperature increases to render the self-inductances L1, L2 to be decreased and to render the phase angles Θiv1, Θiv2 to be decreased (such as state 1);

(D) the phase angle is equal to 30 degrees or more and the coil current is equal to 50% or more (such as state 2 and state 3); in this case, in order to reduce the switching loss, the drive frequencies of all the resonant inverters are decreased to render the phase angle to be smaller than 30 degrees; this value of 30 degrees is a phase angle at which the rated output (P=VI×cos Θ) can be outputted; that is, when the phase angle of the output is equal to a third predetermined value (30 degrees), which is greater than the first predetermined value (20 degrees), or more and the amplitude of the coil current is equal to a fourth predetermined value (50%), which is greater than a second predetermined value (15%), or more, the drive frequencies of all the resonant inverters are increased; and (E) the phase angle is equal to 30 degrees or more and the coil current is smaller than 50%; in this case, proper selection of a power semiconductor element will allow a continuous operation.

Hereinabove, the description has been given of a control for varying the frequency in order to confine the phase angle (phase-angle confinement control), but such a control may also be possible in which the minimum phase angle is confined to render the frequency to be constant (frequency confinement control).

Hereinafter, a description will be given of a phase angle limiter that can be used in both the frequency confinement control and the phase-angle confinement control.

(1) the minimum phase angle limiter 18 degrees:
 a) if the phase angles Θiv1, Θiv2 are smaller than 18 degrees and the coil currents Iiv1, Iiv2 are smaller than 15%, the currents Iiv1, Iiv2 will be increased (up to 15%);
 b) if the phase angles Θiv1, Θiv2 are smaller than 18 degrees and the coil currents Iiv1, Iiv2 are equal to 15% or more, only the drive frequency will be increased.

(2) the maximum phase angle limiter 45 degrees:
 a) if the phase angles Θiv1, Θiv2 are equal to 45 degrees or more and the coil currents Iiv1, Iiv2 are equal to 50% or more, the driving frequency will be decreased; however, if the phase angle has become 45 degrees or more by increasing the frequency due to the phase angle being smaller than 18 degrees and the coil current being equal to 15% or more, the drive frequency will still be increased.

(3) abnormal zone (one of the zones stops driving due to following reasons):
 a) if Iiv is equal to the predetermined values or more and the phase angle is 14 degrees or less, the zone will be instantly stopped in all;
 b) if the coil currents Iiv1, Iiv2 are equal to 50% or more and the phase angles Θiv1, Θiv2 are equal to 45 degrees or more, the zone will be stopped in all after 15 seconds;
 c) if the coil currents Iiv1, Iiv2 are equal to 75% or more and the phase angles Θiv1, Θiv2 are equal to 75 degrees or more, the zone will be stopped in all after 5 seconds.

A description will be given of a configuration of the inductive heating device according to the first embodiment of the present invention, with reference to FIGS. 5 and 2.

Figure 5:
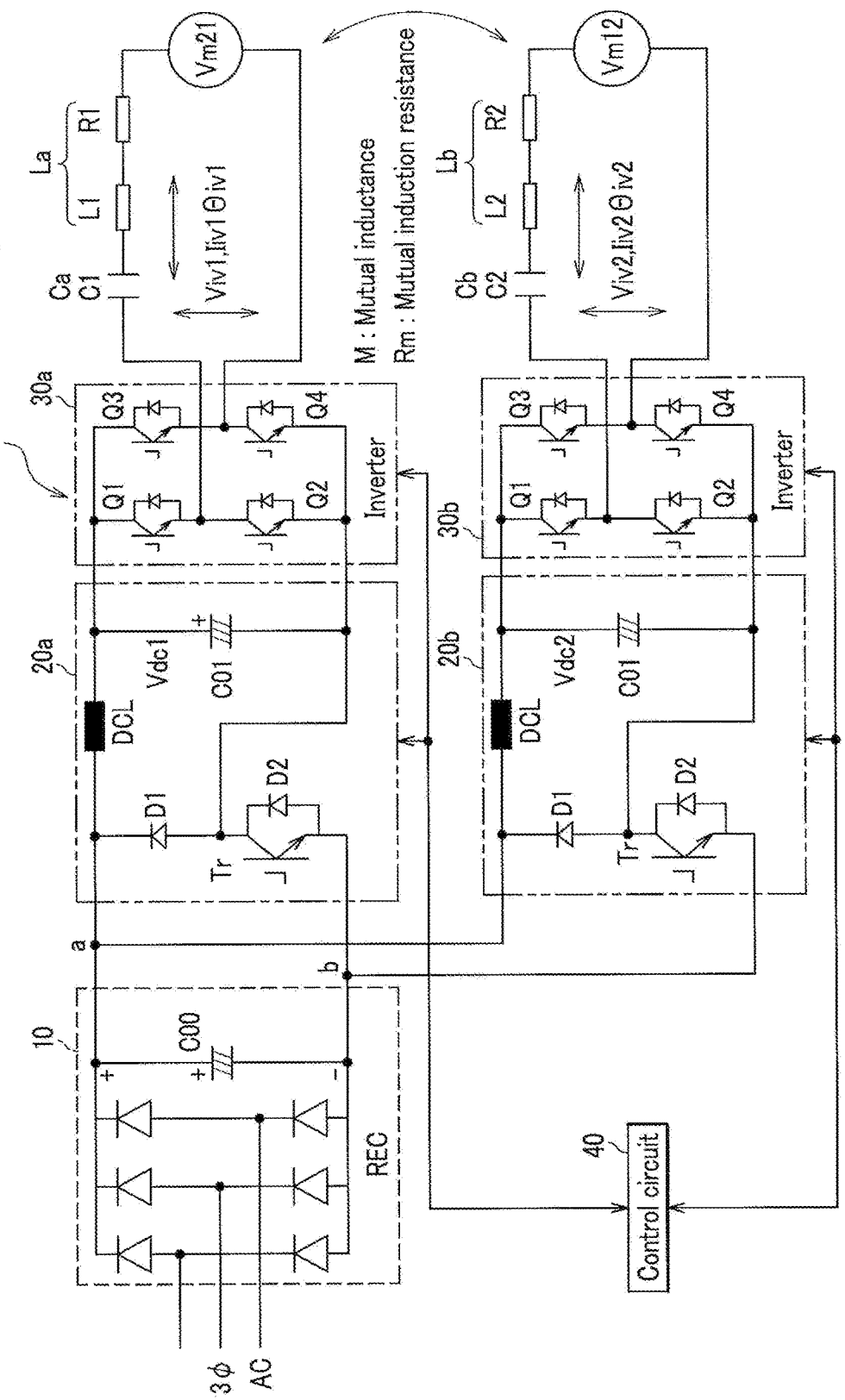
FIG. 5 is a circuit diagram of the inductive heating device according to the first embodiment of the present invention.

In FIG. 5, the inductive heating device 100 is configured to include: a rectifying and smoothing circuit 10; step-down choppers 20a, 20b; a plurality of inverters 30a, 30b; series circuits of capacitors Ca, Cb (having capacitances C1, C2) and inductive heating coils La, Lb (having self-inductances L1, L2 and the resistors of equivalent resistances R1, R2); and a control circuit 40, wherein each of the inductive heating coils La, Lb generates high-frequency magnetic flux to flow eddy currents in a common heating element (e.g., graphite) (FIG. 2), causing the heating element to generate heat. That is, respective inverters 30a, 30b function as resonant inverters for resonating the inductive heating coils La, Lb with the resonant capacitors Ca, Cb.

In addition, the inductive heating device 100 is controlled such that the current phase and the drive frequency are aligned among all inductive heating coils La, Lb so as to reduce the influence from the mutual inductive voltages Vm21, Vm12 caused by adjacent inductive heating coils. That is, the inductive heating device 100 is controlled so that the phases of the coil currents flowing through the two inductive heating coils La, Lb are aligned to have no phase difference in the magnetic field, and this prevents the magnetic field from being weakened in the vicinity of the boundary between the adjacent inductive heating coils to decrease heat generation density by the inductive heating power. As a result, unevenness of the temperature can be avoided on the surface of the object to be heated. Further, the inductive heating device 100 has no circulating current flowing between the inverters 30a, 30b.

Furthermore, the inverters 30a, 30b are directed, for reducing the switching loss, to render the drive frequency higher than the resonance frequency of the self-inductances L1, L2 of the the inductive heating coils La, Lb and the capacitances C1, C2 of the series-connected capacitors Ca, Cb so as to be driven in lagging phase mode of resonant current.

The inductive heating device 100 includes: a rectifying and smoothing circuit 10 that is connected to a commercial power supply AC (3φ); two step-down choppers 20a, 20b that are connected to the rectifying and smoothing circuit 10; inverters 30a,30b that are connected to the step-down choppers 20a, 20b, respectively; series resonant circuits La, Ca, Lb, Cb that are connected to the inverters 30a, 30b, respectively; and a control circuit 40 that controls the inverters 30a, 30b.

The rectifying and smoothing circuit 10 includes a three-phase rectifying circuit REC that is connected to a commercial power supply AC, and an electrolytic capacitor C00 that is connected to output terminals +, − of the three-phase rectifying circuit REC to convert a three-phase AC voltage to a DC voltage. The step-down choppers 20a, 20b are DC/DC converters, each including a transistor Tr, diodes D1, D2, a coil DCL and an electrolytic capacitor C01, to step down a DC voltage Vmax across output terminals a, b of the rectifying circuit 10, to a desired DC voltage Vdc. In each of the step-down choppers 20a, 20b, a cathode of the diode D1 and one end of the coil DCL are connected to the input terminal a, an anode of the diode D1 and a collector of the transistor Tr are connected to a negative electrode of the capacitor C01, an emitter of the transistor Tr is connected to the input terminal b, and the other end of the coil DCL is connected to a positive electrode of the capacitor C01. Note that a commutation diode D2 is connected between the collector and emitter of the transistor Tr.

Each of the step-down choppers 20a, 20b is applied across the coil DCL, when the transistor Tr is on, with a differential voltage between the DC voltage across the capacitor C00 and the DC voltage across the capacitor C01. On the other hand, when the transistor Tr is off the electromagnetic energy stored in the coil DCL is commutated by the diode D1, rendering the coil DCL to have the same potential difference with the DC voltage across the capacitor C01. At this time, the current flowing through the coil DCL is continuous and increases linearly during a time when the transistor Tr is on. Meanwhile, the current flowing through the coil DCL decreases linearly during a time when the transistor Tr is off. Therefore, the differential voltage between the capacitor C00 and the capacitor C001 is converged to a value depending on the DC voltage Vmax and a DUTY ratio. Note that the DUTY ratios are different in the step-down choppers 20a, 20b, respectively and so are the DC voltages Vdc across the capacitors C01.

The inverters 30a, 30b are drive circuits that include a plurality of transistors Q1, Q2, Q3, Q4, respectively, for switching the DC voltages Vdc (Vdc1, Vdc2) across the capacitors C01, to generate from the DC voltages Vdc rectangular wave voltages (high frequency voltage) with a DUTY ratio of 1/2, which are controlled to have a common drive frequency and the coil currents in a same phase, and to supply power to the series circuits of the capacitor and the inductive heating coil. Note that the transistors Q1, Q2, Q3, Q4 include reverse parallel-connected commutation diodes in respective arms. Also note that IGBTs (Insulated Gate Bipolar Transistors), for example, are used for the transistors Tr, Q1, Q2, Q3, Q4.

Here, the capacitors Ca, Cb may resonate with the inductive heating coils La, Lb, and assuming that capacitances are C1, C2 and self-inductances are L1, L2, when the drive frequencies f of the inverters become substantially equal to resonant frequencies $1/(2\pi\sqrt{(L1*C1)})$, $1/(2\pi\sqrt{(L2*C2)})$, sinusoidal currents (coil currents) flow that have values obtained by dividing fundamental wave voltages V1, V2 by series impedances of the self-inductances L1, L2 and the equivalent resistances R1, R2, respectively.

Figure 6:
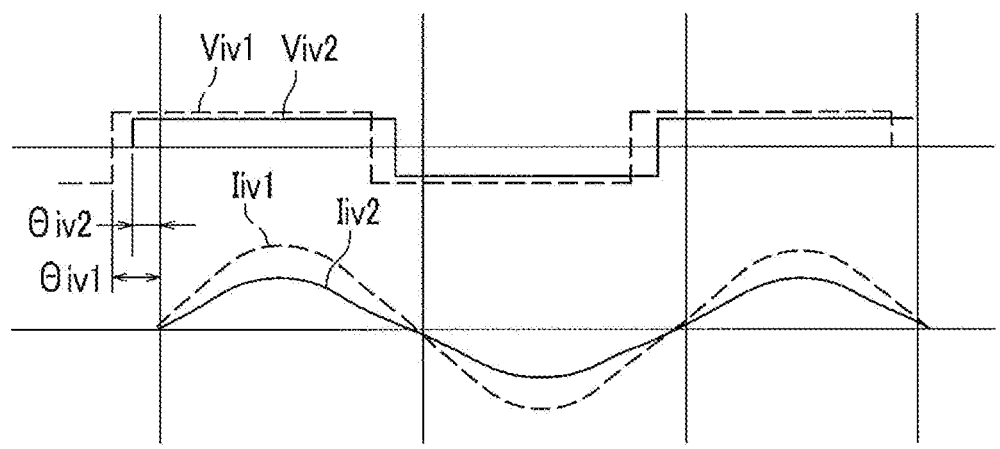
FIG. 6 is a waveform diagram for controlling phase angles within a certain range.

FIG. 6 is a diagram showing the output voltage waveform of the inverter and the coil current waveform.

The output voltages Viv1, Viv2 of the inverters 30a, 30b are potential differences between connection points of emitters of the transistors Q1 and collectors of the transistors Q2, and connection points of emitters of the transistors Q3 and collectors of transistors Q4. In addition, the coil currents Iiv1, Iiv2 are currents repectively flowing through the inductive heating coils La, Lb, and the capacitors Ca, Cb.

The output voltages Viv1, Viv2 are rectangular wave voltages with a DUTY ratio of 1/2 that have the same frequencies and different amplitudes due to the step-down choppers 20a, 20b. The coil currents Iiv1, Iiv2 are sinusoidal currents to have frequencies and phases aligned.

Since the self-inductances L1, L2 and the equivalent resistances R1, R2 are inductive loads, phase angles Θiv1, Θiv2 of the sinusoidal currents lag behind those of the fundamental voltages. Note that as the frequency of the fundamental wave voltage is increased, the phase lag increases, however, the harmonic current scarcely flows because it does not go into a resonant state.

In addition, since the harmonic current does not flow, active power Peff of distorted wave voltage and current can be represented with the fundamental wave voltage V1, the fundamental wave current I1, and the phase angle 81 of the fundamental wave voltage V1 and the fundamental wave current I1, as $$Peff=V1*I1*\cos \Theta 1.$$

Therefore, active power Peff is represented by effective power of the fundamental wave when a series resonant circuit of LCR is driven with the rectangular wave voltage which is a distorted wave voltage.

The control circuit 40 is a circuit that generates gate signals of the transistors Tr in the step-down choppers 20a, 20b and the transistors Q1, Q2, Q3, Q4 in the inverters 30a, 30b to individually control these gate signals (that is, individually control DC voltages Vdc1, Vdc2 and phases of the the rectangular wave voltages), and by way of changing the drive frequencies and/or individually controlling the coil currents, to control the phase angles Θiv1, Θiv2 of the outputs so as to fall within the optimum phase angle range. The control circuit 40 is constituted by a CPU (Central Processing Unit) as a control unit, and others to implement functions by the CPU executing a program. In addition, the control circuit 40 can measure the size of the DC voltages Vdc (Vdc1, Vdc2) of the step-down choppers 20a, 20b and the output currents Iiv1, Iiv2 of the inverters 30a, 30b, and the phase angles Θiv1, Θiv2 as output phase angles.

REFERENCES

The embodiment described above controls the positions of the gate pulses of the transistors Q1, Q2, Q3, Q4 to align the phases of the coil currents. However, the phase of the coil current can also be aligned by rendering a phase of the mutual inductive voltage, which is induced across the inductive heating coil La in one zone from the inductive heating coil Lb in the other zone, to be equal to the phase of the resonant circuit composed of the inductive heating coil La, the capacitor Ca, and the equivalent resistor.

Figure 7A:
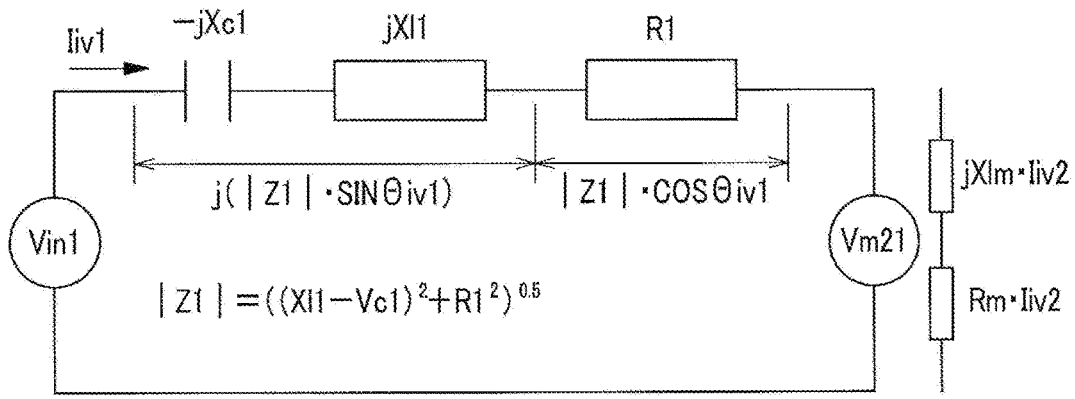
FIGS. 7A to 7C are equivalent circuit diagrams of voltage inverters and a current inverter as REFERENCES.
Figure 7B:
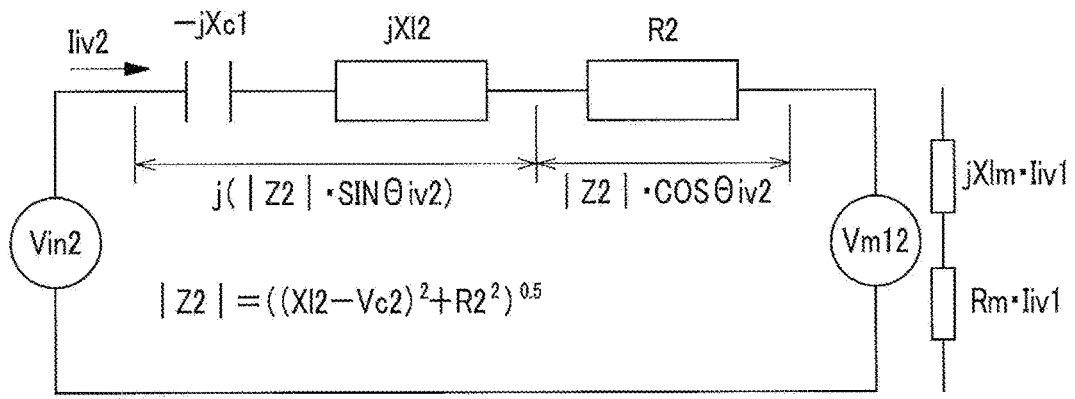
Figure 7C:
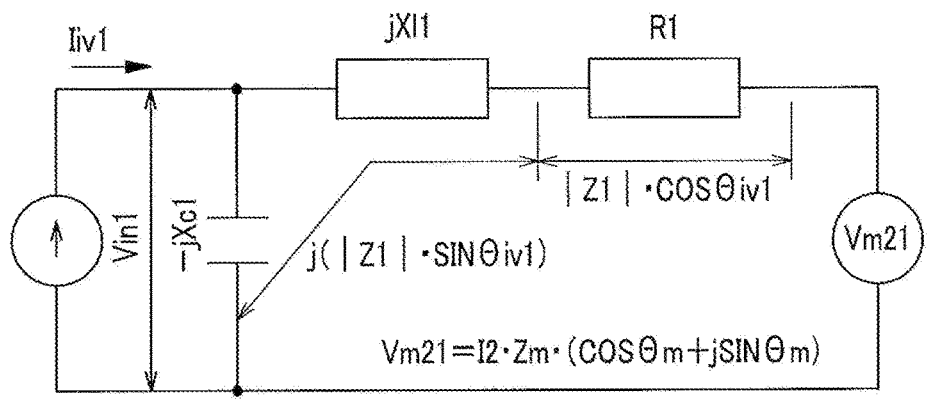

FIGS. 7A to 7C are equivalent circuit diagrams of voltage inverters and a current inverter as references, where FIG. 7A is an equivalent circuit diagram of one inverter, FIG. 7B is that of the other inverter, and FIG. 7C is that of the current inverter.

In the equivalent circuit diagram of FIG. 7A, the impedance of the capacitor Ca is indicated by $-jXc1$, so is the impedance of the inductive heating coil La by $jXl1$, and so is the equivalent resistor by the resistance R1. An impedance Z1 of a resonant circuit connected to the inverter Eiv1 has a reactive component of $(-jXc1+jXl1)$ and an active component of R1. In addition, the impedance Z1 can be represented as $j(|Z1|*\sin \Theta iv1)+|Z1|*\cos \Theta iv1$. Here, $$|Z1|=\{(Xl1-Xc1)^2+R1^2\}^{0.5}.$$

Further, the mutual inductive voltage Vm21 induced across the inductive heating coil La is represented as, assuming that the current flowing through the inductive heating coil Lb is Iiv2 and the mutual inductive reactance $Xm=\omega M$, $$Vm21 = Iiv2*(jXm+Rm) = Iiv2*(j\omega M + Rm).$$
$$= Iiv2*|Zm|*(\cos\Theta m + j\sin\Theta m)$$

Here, $|Zm|=(Rm^2+Xm^2)^{0.5}$.

In the equivalent circuit diagram of FIG. 7B, the impedance of the capacitor Cb is indicated by $-jXc2$, so is the impedance of the inductive heating coil Lb by $jXl2$, and so is the equivalent resistor by the resistance R2. An impedance Z2 of a resonant circuit connected to the inverter Eiv2 has a reactive component of $(-jXc2+jXl2)$ and an active component of R2. In addition, the impedance Z2 can be expressed as $j(|Z2|*\sin \Theta iv2)+|Z2|*\cos \Theta iv2$. Here, $$|Z2|=\{(Xl2-Xc2)^2+R2^2\}^{0.5}.$$

Further, the mutual inductive voltage Vm12 induced across the inductive heating coil Lb is represented as, assuming that the current flowing through the inductive heating coil La is Iiv1 and the mutual inductive reactance $Xm=\omega M$, $$Vm12 = Iiv1*(jXm+Rm) = Iiv1*(j\omega M + Rm).$$
$$= Iiv1*|Zm|*(\cos\Theta m + j\sin\Theta m)$$

Here, $|Zm|=(Rm^2+Xm^2)^{0.5}$.

In FIGS. 7A and 7B, when a control is performed so as to be $\Theta iv1=\Theta m=\Theta iv2$, phases of the coil currents Iiv1, Iiv2 are aligned, even if reactances Xl1, Xl2 and self-inductances L1, L2 of the inductive heating coils La, Lb are different from each other.

FIG. 7C is an equivalent circuit diagram of the current inverter. A current source that flows the current Iiv1 is connected across both ends of a capacitor having an impedance $-jXc1$, where one end of such parallel connection is connected via a circuit having impedance $(jXl1+R1)$ to one end of a voltage source that generates a mutual inductive voltage Vm21, while the other end of the parallel connection is connected to the other end of the voltage source. Note that $Vm21=Iiv2 \times Zm(\cos \Theta m + j \sin \Theta m)$.

At this time, an impedance (jXl1−jXc1) of the capacitor and the inductive heating coil is represented by j(|Z1|*sin Θiv1), while an impedance of the equivalent resistance R1 is represented by |Z1|*cos Θiv1.

The phase angle (power supply phase) Θiv1 between the current iv1 and the voltage Viv1 of the current source becomes identical to the load phase Θm.

MODIFICATIONS

The present invention should not be limited to the embodiments described above, and various modifications can be made, for example, as follows:
(1) the embodiment has employed an IGBT as a switching element of the inverter, but transistors such as an FET (Field Effect Transistor) and a bipolar transistor can also be employed;
(2) the embodiment has employed the step-down choppers 20a, 20b that decreases the voltage from the DC voltage in order to supply DC power to the inverters, but a DC voltage can also be generated from the commercial power supply by using a converter; in addition, not only three-phase power supply but also single-phase power supply can be used as the commercial power supply;
(3) the embodiment has supplied the power of the common DC voltage Vdc to the inverters 30a, 30b associated with all the inductive heating coils La, Lb, but an inductive heating coil that requires the maximum amount of heating and an inverter associated with this inductive heating coil may be added to supply power of the DC voltage Vmax to the added inverter for supplying power of the DC voltage Vdc to the inverters 30a, 30b; and
(4) the inductive heating device 100 according to the embodiment has employed the two inductive heating coils La, Lb, the two step-down choppers 20a, 20b, and the two inverters 30a, 30b, but more number of inductive heating coils, step-down choppers and inverters may be employed.

What is claimed is:

1. An inductive heating device comprising:
a plurality of resonant inverter circuits that supply power to a corresponding plurality of inductive heating coils, respectively, under conditions where mutual inductances are present to cause mutual inductive voltages between adjacent inductive heating coils;
a power supply circuit that supplies DC voltages to each of the plurality of resonant inverter circuits; and
a control circuit that is operatively connected to generate a gate signal, the gate signal being outputted to all of the plurality of resonant inverter circuits, the control circuit being operatively connected to each of the plurality of resonant inverter circuits so as to provide a drive frequency that is the same for all of the plurality of resonant inverter circuits such that drive frequencies of output voltages from the plurality of resonant inverter circuits are the same as drive frequencies of coil currents in the corresponding inductive heating coils, the control circuit being configured to adjustably generate the gate signal at the drive frequency in response to predetermined differences in the coil currents and predetermined levels of mutual inductance between adjacent inductive heating coils such that phase angles between the output voltages from the plurality of resonant inverter circuits and the coil currents are adjusted to be within a predetermined range of each other,
wherein the lower limit of the predetermined range is a minimum output phase angle to secure a zero volt switching and the upper limit of the predetermined range is a phase angle to have rated power of the inductive heating device,
wherein the power supply circuit includes a plurality of step down circuits that supply stepped down DC voltages to corresponding ones of the plurality of resonant inverter circuits, the control circuit being operatively connected to each of the plurality of step down circuits so as to output the gate signal to each of the step down circuits and control the stepped down DC voltages based on the drive frequency, and
wherein each of the plurality of inverter circuits includes a plurality of switching elements, the control circuit being operatively connected to each of the plurality of switching elements in all of the plurality of resonant inverter circuits so as to provide the drive frequency that is the same for all of the plurality of resonant inverter circuits such that the drive frequencies of the output voltages from the plurality of resonant inverter circuits are the same as the drive frequencies of the coil currents in the corresponding inductive heating coils.

2. An inductive heating device comprising:
a plurality of resonant inverter circuits that supply power to a plurality of inductive heating coils, respectively, under conditions where mutual inductances are present to cause mutual inductive voltages between adjacent inductive heating coils;
a power supply circuit that supplies DC voltages to each of the plurality of resonant inverter circuits; and
a control circuit that is operatively connected to generate a gate signal, the gate signal being outputted to all of the plurality of resonant inverter circuits, the control circuit being operatively connected to each of the plurality of resonant inverter circuits so as to provide a drive frequency that is the same for all of the plurality of resonant inverter circuits such that drive frequencies of output voltages from the plurality of resonant inverter circuits are the same as drive frequencies of coil currents in the corresponding inductive heating coils, the control circuit being configured to at least one of adjustably generate the gate signal at the drive frequency and adjustably control individual coil currents, by rendering the drive frequency to be constant, in response to predetermined differences in the coil currents and predetermined levels of mutual inductance between adjacent inductive heating coils such that phase angles between the output voltages from the plurality of resonant inverter circuits and the coil currents are adjusted to be within a predetermined range of each other,
wherein the lower limit of the predetermined range is a minimum output phase angle to secure a zero volt switching and the upper limit of the predetermined range is a phase angle to have rated power of the inductive heating device,
wherein the power supply circuit includes a plurality of step down circuits that supply stepped down DC voltages to corresponding ones of the plurality of resonant inverter circuits, the control circuit being operatively connected to each of the plurality of step down circuits so as to output the gate signal to each of the step down circuits and control the stepped down DC voltages based on the drive frequency, and
wherein each of the plurality of inverter circuits includes a plurality of switching elements, the control circuit being operatively connected to each of the plurality of switching elements in all of the plurality of resonant inverter circuits so as to provide the drive frequency that is the same for all of the plurality of resonant inverter circuits such that the drive frequencies of the output voltages from the plurality of resonant inverter circuits are the same as the drive frequencies of the coil currents in the corresponding inductive heating coils.

3. The inductive heating device according to claim 2, wherein the control circuit controls so that the coil currents are aligned in phase.

* * * * *